(12) United States Patent
Maryfield et al.

(10) Patent No.: US 8,520,298 B2
(45) Date of Patent: Aug. 27, 2013

(54) TIGHTLY COILED AMPLIFYING OPTICAL FIBER WITH REDUCED MODE DISTORTION

(75) Inventors: Tony Maryfield, Poway, CA (US); Robert Koch, Santee, CA (US); Anand Hariharan, Franklin Park, NJ (US)

(73) Assignee: Cubic Corporation, San Diego, CA (US)

( * ) Notice: Subject to any disclaimer, the term of this patent is extended or adjusted under 35 U.S.C. 154(b) by 649 days.

(21) Appl. No.: 12/712,902

(22) Filed: Feb. 25, 2010

(65) Prior Publication Data

US 2010/0214650 A1 Aug. 26, 2010

Related U.S. Application Data

(60) Provisional application No. 61/155,770, filed on Feb. 26, 2009.

(51) Int. Cl.
*H04B 10/17* (2006.01)
*G02B 6/02* (2006.01)
*G02B 6/036* (2006.01)
*H04B 10/12* (2006.01)

(52) U.S. Cl.
USPC .................. 359/341.1; 385/123; 385/127

(58) Field of Classification Search
USPC ............... 372/6; 359/341.1–341.3; 385/123, 385/126–127
See application file for complete search history.

(56) References Cited

U.S. PATENT DOCUMENTS

| | | | | |
|---|---|---|---|---|
| 5,147,432 A | * | 9/1992 | Edmonston et al. | 65/423 |
| 6,826,335 B1 | * | 11/2004 | Grudinin et al. | 385/43 |
| 7,164,835 B2 | * | 1/2007 | Matsuo et al. | 385/127 |
| 7,181,119 B2 | * | 2/2007 | Kakui et al. | 385/129 |
| 7,283,714 B1 | * | 10/2007 | Gapontsev et al. | 385/126 |
| 7,366,387 B2 | * | 4/2008 | Matsuo et al. | 385/123 |
| 7,406,236 B2 | * | 7/2008 | Ikeda et al. | 385/126 |
| 7,440,663 B2 | * | 10/2008 | Matsuo et al. | 385/123 |
| 2003/0161357 A1 | * | 8/2003 | Bolshtyansky et al. | 372/6 |
| 2006/0263018 A1 | * | 11/2006 | Takagi et al. | 385/123 |
| 2007/0147756 A1 | * | 6/2007 | Matsuo et al. | 385/123 |
| 2008/0025679 A1 | * | 1/2008 | Ikeda et al. | 385/123 |
| 2010/0195194 A1 | * | 8/2010 | Chen et al. | 359/341.3 |

FOREIGN PATENT DOCUMENTS

JP 2008058663 A * 3/2008

* cited by examiner

*Primary Examiner* — Eric Bolda
(74) *Attorney, Agent, or Firm* — Kilpatrick Townsend & Stockton LLP

(57) ABSTRACT

Systems and devices enabling a highly compact design for a fiber-based lasing and/or amplifying system are disclosed. In some instances, a tightly-coiled active optical fiber may be coupled with a seed source and a pump source for optical amplification and other applications. Such systems can be disposed in a small footprint package such as a butterfly package or a high heat load package. In some instances, the tightly-wound active optical fiber may further include a fiber Bragg grating adapted to accommodate bends in the active optical fiber. The active optical fiber may further utilize a cladding shaped to maintain an orientation of the active optical fiber in relation to a bend in the fiber.

7 Claims, 8 Drawing Sheets

TIGHTLY COILED AMPLIFYING OPTICAL FIBER WITH REDUCED MODE DISTORTION

CROSS-REFERENCE TO RELATED APPLICATIONS

This application claims priority to Provisional U.S. Patent Application No. 61/155,770 filed Feb. 26, 2009, by Maryfield et al. and entitled "BUTTERFLY LASER," of which the entire disclosure is hereby incorporated by reference for all purposes.

BACKGROUND

This invention relates generally to optical fibers. More specifically, the invention relates to a tightly-coiled optical fiber doped with rare earth elements.

Optical fibers are used extensively in a variety of optical applications, such as telecommunication, fiber optic sensors, audio signal transmission, and various other applications requiring optical waveguides. One reason for the optical fiber's widespread use is its ability to efficiently conduct light by confining the optical energy into the optical fiber. If the optical fiber is bent beyond a certain minimum bend radius, however, this efficiency suffers due to bend loss. Bend loss thus restricts optical fiber applications requiring small bend radii such as tight winding of the optical fiber.

Bend loss is especially restricting in applications requiring high optical powers. For instance, relevant telecommunication standards, prescribe approximately 1.75 centimeters (cm) as the minimum bend radius for a standard fiber with a cladding diameter of 125 microns. For higher powers and energies large-mode-area (LMA) fibers are frequently used. LMA fibers provide large mode areas by the lowest numerical aperture (NA) core waveguides. Because a low NA typically correlates to higher bend loss, the implied bend losses for LMA fibers are relatively large. Thus, in very high power devices, the bend radius of typical fluoroacrylate-clad fibers can be roughly 5 cm, and for all-glass structures, it could be as large as 20 cm. It is further assumed that bending the core of a fiber effectively squeezes the modal intensities in the outward direction. In an active fiber, such bending would result in an uneven gain between the centrosymmetric mode and the distal modes. These restrictions on the tight bending of active optical fiber have prevented the use of coiled active optical fiber in compact applications.

It is therefore desirable to provide systems and devices that allow an active optical fiber to be coiled in a tight radius without suffering significant bend loss.

BRIEF SUMMARY OF THE INVENTION

Embodiments of the present invention provide such a tightly-coiled active optical fiber. According to some embodiments, the tightly-coiled active optical fiber can comprise a core region doped with one or more rare earth elements and a cladding region surrounding the core region, and further form one or more coils.

The tightly-coiled active optical fiber can be coupled with a seed source and a pump source for optical amplification and other applications. In some embodiments of the invention, the pump source may be a flash pump disposed near the coils of the active optical fiber such that the light emitted by the flash pump is absorbed by the coils of active optical fiber. In other embodiments, the light from a pump source may be coupled into the coils of active optical fiber along with the light from the seed source. A tightly-coiled active optical fiber, pump source, seed source, or any combination of these elements, can be disposed in a small footprint package such as a butterfly package or a high heat load package.

Some embodiments can include a mode confinement structure inside the cladding of the optical fiber to reduce modal distortion due to the bending of the optical fiber within the coils. The location of the mode confinement structure within the active optical fiber can be maintained by structurally adapting the cladding to maintain the active optical fiber's orientation in relation to the bends.

A fiber Bragg grating may also be used in the tightly-coiled active optical fiber. According to some embodiments of the invention, the individual grating periods of the fiber Bragg grating can be structurally adapted to accommodate the bending of the coils in the active optical fiber. The fiber Bragg grating can also be used in conjunction with a cladding that is structurally adapted to maintain the active optical fiber's orientation in relation to the bends. The refractive index profiles for the grating periods need not be uniform. For example, they can be apodized, according to some embodiments of the present invention. Furthermore, the gratings can be adjusted to form a chirped fiber Bragg grating structure.

In some embodiments, the ends an tightly-coiled active optical fiber can include a fiber Bragg grating or other reflective surfaces or partially reflective surfaces. Such surface can provide more light within the fiber optic that can trigger stimulated emissions within the fiber optic.

The cladding region of the tightly-coiled active optical fiber may be surrounded by other materials, according to some embodiments of the present invention. For example, the cladding region may be disposed within a second cladding region. In other embodiments, the cladding region may be coated with a metallic or a carbon coating.

DETAILED DESCRIPTION OF THE INVENTION

Figure 1:
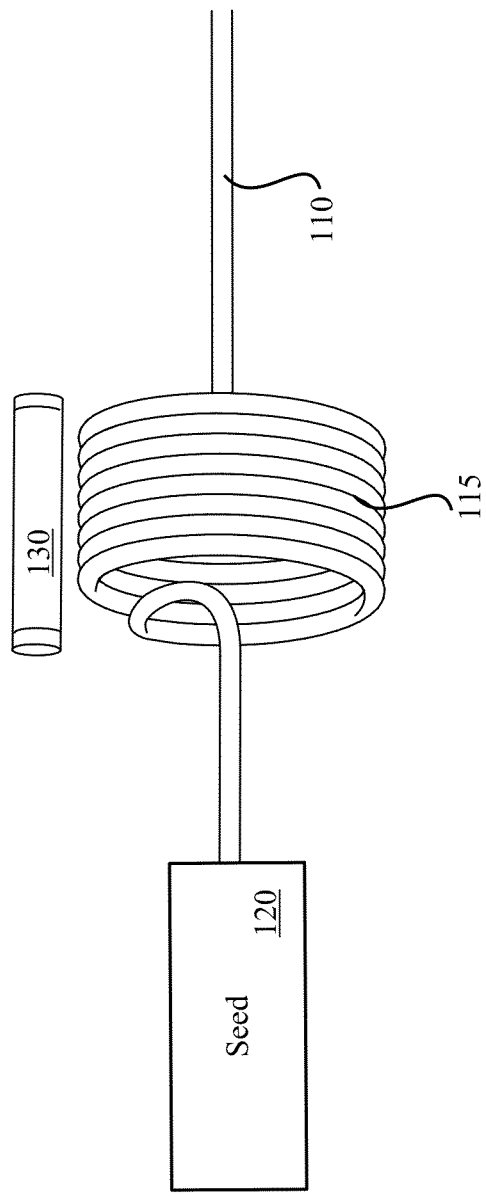
FIG. 1 shows an active optical fiber as a light amplifier according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

As used throughout this disclosure the term "active" is used to denote a device that is gain bearing or that generates gain. For example, an active element may be said to generate gain by receiving an input and providing an output with more energy. Moreover, the term "active" may further denote a conversion from one form of energy to another form. For example, energy in the form of light of one wavelength may be converted to light of another wavelength by an active element.

Generally speaking, embodiments of the present invention provide systems and components relating to a coiled active optical fiber is that is doped with rare earth ions. The coiled active optical fiber may be tightly coiled, for example, with a coil radius of less than or equal to about 10 millimeters (mm) in some embodiments, and less than or equal to about 3 mm in other embodiments, although the present invention contemplates values greater than 10 mm and less than 3 mm. For a typical optical fiber, having a core surrounded by a cladding region, these small bend radii are difficult to achieve without significant bend loss. However, it may be accomplished by raising the numerical aperture (NA) of the active optical fiber. A bend loss of 1 dB per meter or less is desirable in amplification applications utilizing a tightly-coiled active optical fiber, and, for a fiber with a core diameter of 8.2 microns, an NA of roughly 0.14 or more may be used in applications requiring a bend radius of 10 mm. It will be understood that bend loss will be greater in fibers having larger core diameters. For example, an application requiring a bend radius of 10 mm and having an optical fiber with a core radius of 12 microns, an NA of 0.2 or more may be required. Optical fibers with high NA values, which can exceed 0.6, are currently available on the market, and adjusting the NA to achieve a bend loss of 1 dB per meter or less for a given bend radius can be done using known methods for calculating bend loss.

Decreasing the bend radius of an active optical fiber presents additional difficulties. By decreasing the bend radius, the bend strain is substantially increased in the fiber. At sufficiently small bend radii, this bend strain can cause mechanical failure of the fiber cladding. This can be overcome by decreasing the optical fiber cladding diameter. For example, a cladding diameter of 18 microns may be used instead of a more common cladding diameter, such as 125 microns. According to other embodiments, a cladding diameter as small as 10 microns may be used. Additionally, according to some embodiments of the present invention, the optical fiber may comprise a double clad fiber (DCF), which has a second region of cladding surrounding the first cladding region, the second region of cladding having a lower index of refraction than the first cladding region. The second cladding region of such a DCF can represent a roughly 10 percent increase in the diameter size of the optical fiber, and can provide additional mechanical strength to the coiled optical fiber and further enable applications requiring cladding pumping. Other techniques known in the art may also be used to remedy mechanical failures cause by bend strain, such as including metallization and/or carbon coating of the optical fiber.

The tightly-coiled active optical fiber can be single mode or multispatial mode. Fundamental mode propagation is ensured by carefully launching the fundamental mode. The mode field diameters of the fundamental mode are not decreased significantly enough to initiate nonlinear effects. Modal confinement is also enforced by using conventional gain guiding techniques in the active optical fiber. Moreover, selectively doping the rare earth at the center of the core with radial overlap with the fundamental mode enhances the maintenance of central symmetry of the fundamental mode, despite the tendency of the coiled fiber to distort the fundamental mode.

Additionally, according to some embodiments of the present invention, a mode confinement structure may be utilized within the cladding, disposed near the core on the radial distal side of a bend in the coil. The confinement structure can be made of glass, plastic, or other materials, and may resemble stress elements commonly used in optical fibers such as PANDA, bow-tie, and the elliptical-cladding fibers. Because the mode confinement structure is configured for a particular orientation relative to the bending of the fiber, the use of a mode confinement structure can also be used in conjunction with a cladding that is shaped to maintain an orientation of the optical fiber relative to the bend. One having ordinary skill in the art will realize that such shaping of the cladding can be done in a variety of ways. For example, the cladding may include one or more flat surfaces or grooves with which the optical fiber can maintain its orientation by abutting the surfaces or grooves against a spool, coils of optical fiber, or other structures.

The amount of coils in the active optical fiber can vary, depending on the application. Many embodiments include anywhere from 100 to 1000 coils in the active optical fiber, although other embodiments can include up to 10,000 coils or more.

Non-linear gain effects can be employed within a tightly-coiled active optical fiber. For example, Raman amplification, Brillouin amplification, four-wave-mixing amplification, frequency mixing amplification (freq mixing, doubling etc), and/or parametric amplification can be used. Various other gain effects can be employed.

An active optical fiber may be doped with any rare-earth ion or an ion including rare-earth elements. For example, the active optical fiber may be doped with ions including Lanthanum, Cerium, Praseodymium, Neodymium, Promethium, Samarium, Europium, Gadolinium, Terbium, Dysprosium, Holmium, Erbium, Thulium, Ytterbium, and/or Lutetium. The rare-earth ion may be chosen based on the ion's fluorescence spectrum and/or the wavelength range required for the application. Moreover, the active optical fiber material may include material not commonly used in the telecommunication industry.

A fiber Bragg grating may also be used in the tightly-coiled active optical fiber. To accommodate the tight bending of the coils, the grating periods can comprise laterally tilted Bragg structures. These structures follow the core along a certain length of a bend the active optical fiber and can be longer on the side further from the bend radius on the side closest to the bend radius, to reflect the bending of the coils. These shapes may tend to broaden the reflection bandwidth, but certain embodiments of the present invention utilize a chirped grating structure to reduce such broadening. It can be noted that because the grating structures are adapted to accommodate a bend in the coiled optical fiber, they are designed for a specific orientation relative to the bending of the fiber. Thus, according to certain embodiments of the present invention, these Bragg grating structures may be used in conjunction with a cladding shaped to maintain the orientation of the optical fiber in relation to a bend, as discussed above.

FIG. 1 shows a optical fiber 110 with a coil 115 coupled with a laser 120 and disposed relative to a flash pump 130 according to some embodiments. Flash pump 130, in some embodiments, can be any type of energy source. The sizes and dimensions shown in the figure are not to scale. Laser 120 is coupled with optical fiber 110 such that light emitted from laser 120 is directed into optical fiber 110. Flash pump 130 illuminates the coil 115 portion of optical fiber 110 with light and provides energy that is absorbed into the fiber including the rare-earth dopant. The light from flash pump 130 excites atoms in the fiber into excited states to achieve population inversion resulting in stimulated emission. Thus, flash pump 130 provides light amplification or gain for the laser resulting in increased light production. Flash pump 130 may be a light source providing white light, narrow spectrum light and/or broad spectrum light. The flash pump, for example, can be a light emitting diode, laser, or laser diode. In some embodiments, flash pump can be replaced with an electric pump or other non optical pump source. Coil 115 in optical fiber 110 provides a greater absorption volume of rare-earth ions that may be excited by light from flash pump 130. In some embodiments, optical fiber 110 may be coiled around flash pump 130; that is, flash pump 130 may be placed within coil 115.

Portions of optical fiber 110 may be coated with a dielectric coating in some embodiments. The dielectric coating may reflect unwanted wavelengths and thus substantially restrict unwanted wavelengths from being absorbed in optical fiber 110. Rare-earth dopants typically have a known fluorescence profile. That is, rare-earth dopants may be excited by a first wavelength and then produce light from stimulated emissions at a second wavelength. Thus, rare-earth dopants may be selected based on the dopants that produce stimulated emissions at the same wavelength as those produced by laser 120. Flash pump 130 and/or the dielectric coating may also be selected to provide light at a wavelength that excites the rare-earth dopants into the proper excited state to produce stimulated emissions.

Optical fiber 110 may include a cladding surrounding a light-conducting core. The cladding may have a smaller than average thickness to accommodate tight bends in the optical fiber. As mentioned previously, the cladding may include a carbon coating and/or a metallization coating. Cladding with a metalized coating may enable the cladding to be directly soldered. In some embodiments, after coils have been made in the fiber, the fiber may be heated to a temperature above which the cladding melts but below where the core melts. At such a temperature the cladding may flow and fuse together creating an integrated optical device.

Laser 120 may be any type of laser. For example, laser 120 could be a pulsed distributed feedback laser (DFB) or a pulsed Master Oscillator Power Amplifier (MOPA). In some embodiments, laser 120 could be a Vertical Cavity Surface Emitting Laser (VCSEL) or a Quantum Well Laser as well. Moreover, in other embodiments, laser 120 could include a laser diode, a light emitting diode, or other light source. Laser 120 can also include a semiconductor laser, a fiber laser, and/or a diode laser according to various embodiments.

Figure 2:
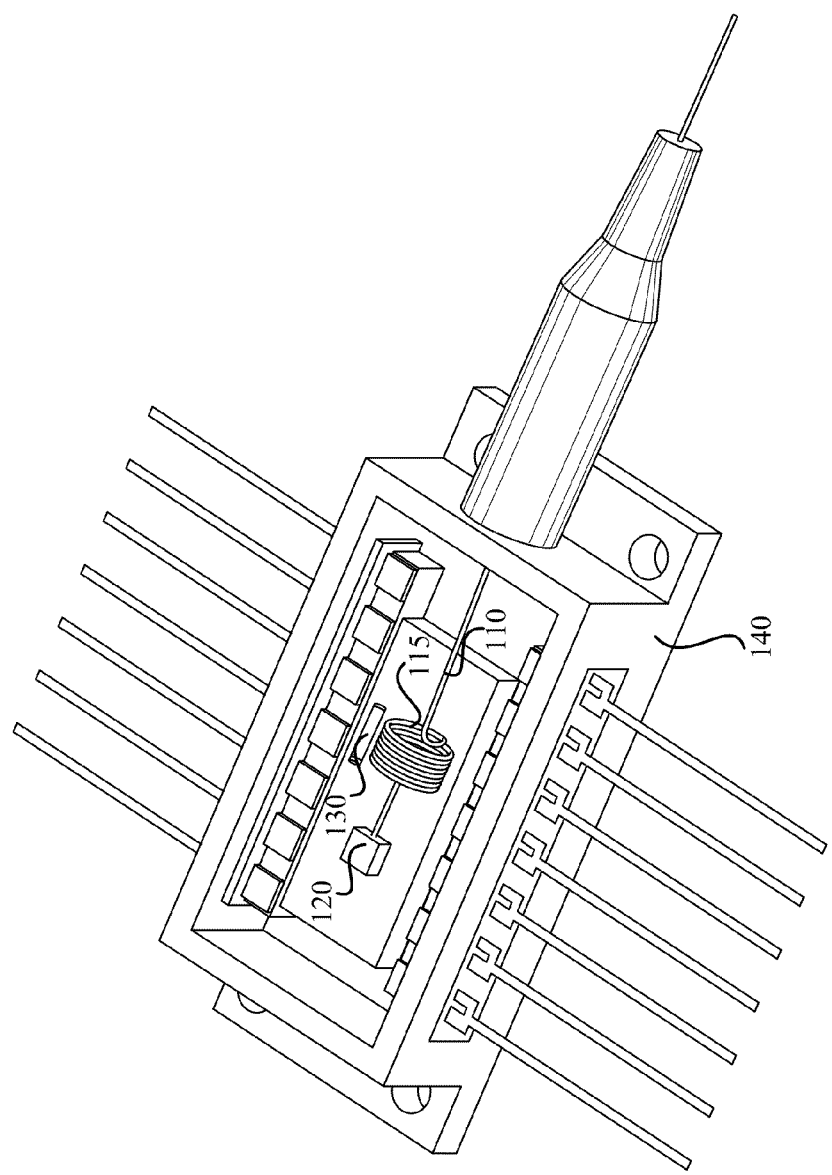
FIG. 2 shows an active optical fiber, pump, and seed source disposed in a small footprint butterfly package according to some embodiments.

FIG. 2 shows laser 120, optical fiber 110 and flash pump 130 disposed within a butterfly package 140 according to one embodiment. In this arrangement, coil 115 reduces the footprint size of flash pump 130 and optical fiber 110 and allows the system to be placed within a small package 140 such as the butterfly package. Other packaging types may be used, especially those that are small. By providing the laser and optical fiber in a small package, it allows for a the combined laser, amplifying fiber, and the pump to have a couple with a circuit board in a single package. The packaging, for example, can be as little as 10 mm in any one dimension. In some embodiments, the packaging is less than 20 mm in one dimension.

Figure 3:
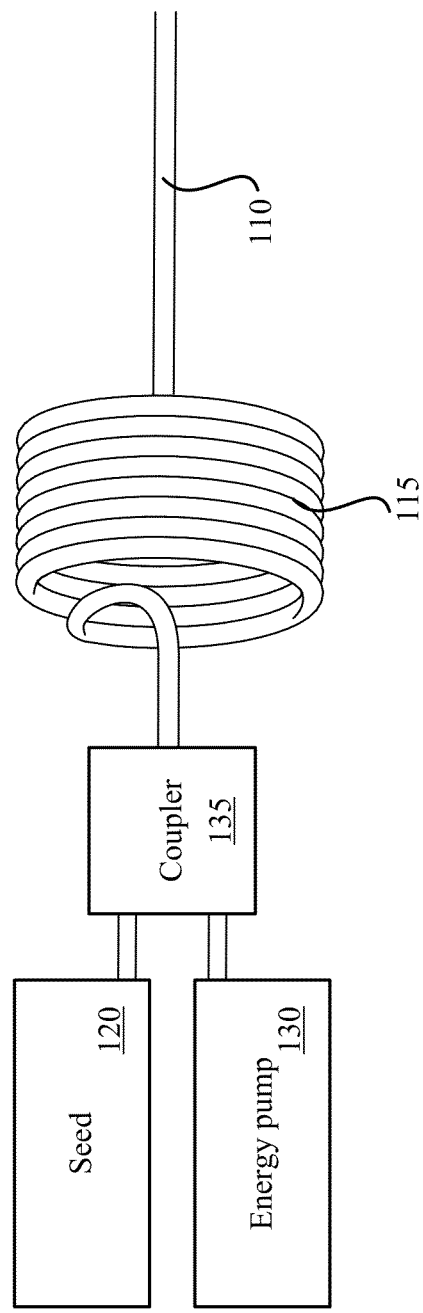
FIG. 3 shows an active optical fiber coupled with a seed source and pump source through an optical coupler according to one embodiment.

FIG. 3 shows an energy pump 130 (e.g., a photo diode), coupled with seed source 120 using optical coupler 135. Optical coupler 135 can combine and focus the optical transmission from energy pump 130 and seed source 120 into coiled fiber 115. Coiled fiber 115 can include rare earth dopants and can therefore be an active element. Thus, pump energy can enter the optical fiber through the same surface as the seed source 120. Such coupling of the pump and seed energies can be employed by utilizing well known fabrication and mass manufacturing techniques. The compact size and manufacturability of these components thereby facilitate the co-packaging of pump, seed, and coupling elements, or any combination thereof, into standard packages such as the butterfly package and the high heat load package.

Figure 4:
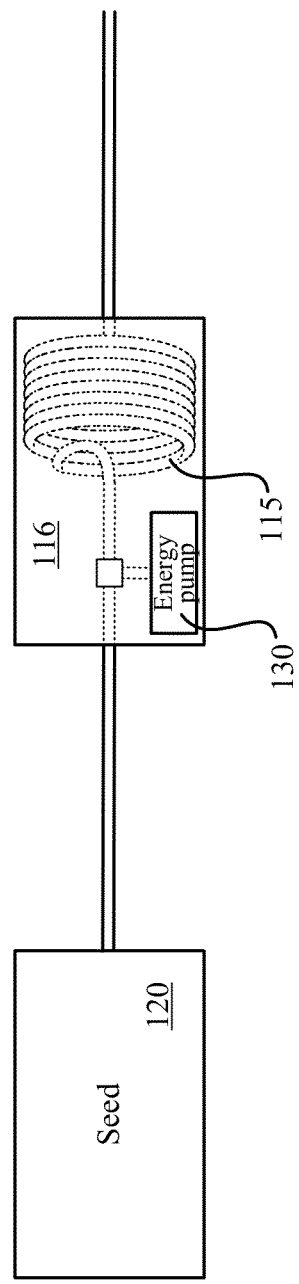
FIG. 4 shows an active optical fiber disposed within a small footprint package along with a pump source according to one embodiment.

FIG. 4 shows energy pump 130 located within packaging 116 along with coiled active fiber 115 according to some embodiments. Seed source 120 can be externally coupled with package 116.

Figure 5:
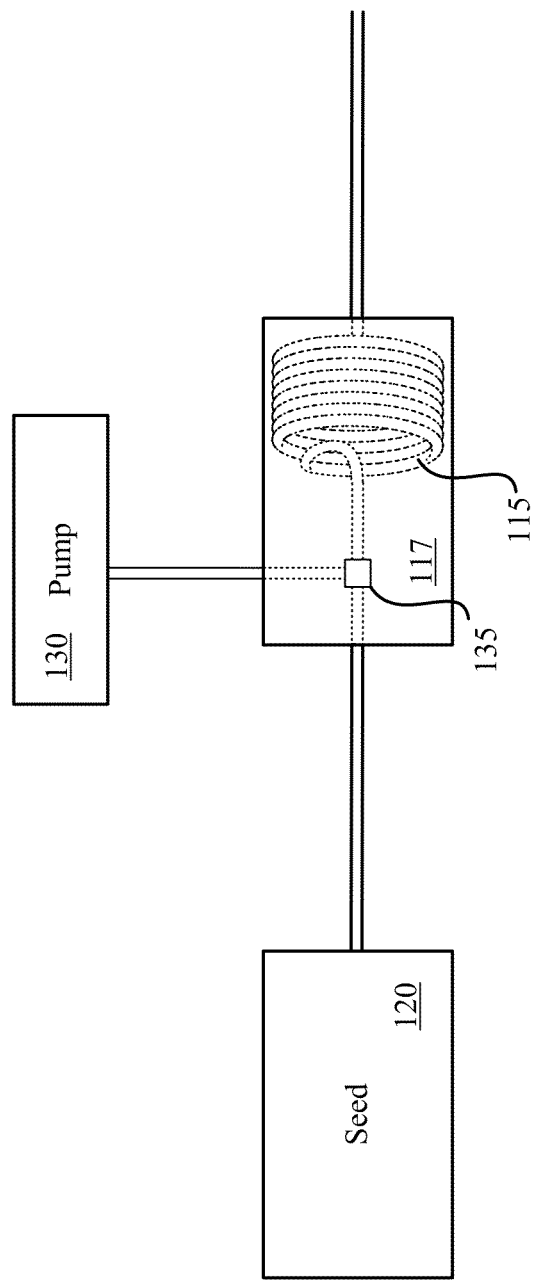
FIG. 5 shows an active optical fiber disposed within a small footprint package externally coupled with a seed source and a pump source according to one embodiment.

FIG. 5 shows a coiled active fiber package 117 with a coiled active fiber 115 and an optical coupler 135 according to some embodiments. Optical coupler 135 can be coupled with an external energy pump 130 and seed source 120.

Figure 6:
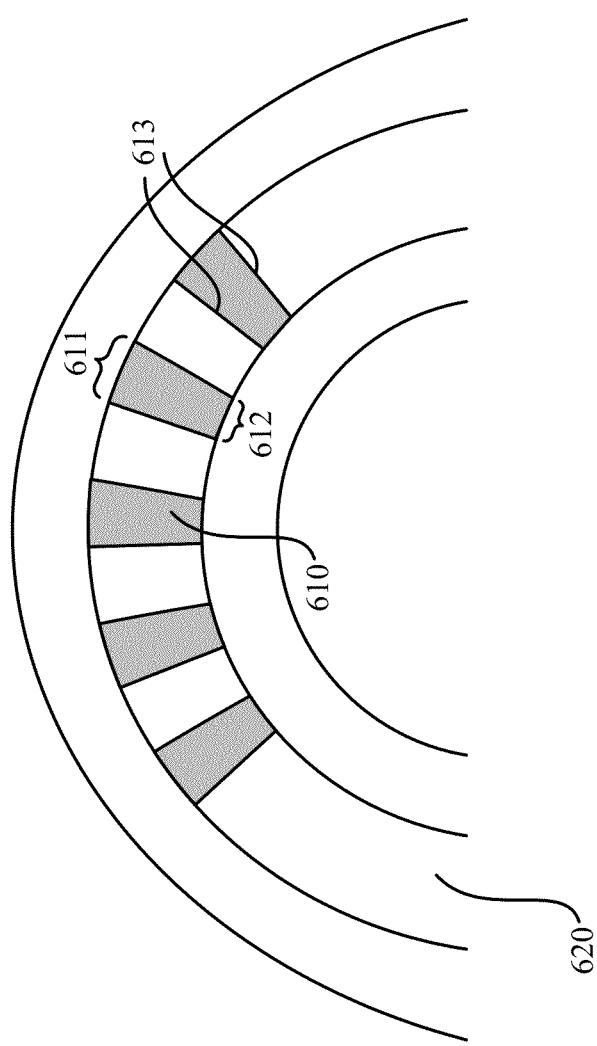
FIG. 6 shows a fiber Bragg grating disposed within an active optical fiber, adapted to accommodate a bend in the active optical fiber, according to some embodiments.

FIG. 6 shows an overhead view of a fiber Bragg grating disposed within a length of bent optical fiber, in accordance with one embodiment. The sizes and dimensions shown in the figure are not to scale. The fiber Bragg grating comprises individual fiber gratings 610 adapted to accommodate a bend in the optical fiber. For an optical fiber bending around a central axis, the individual fiber gratings 610 can comprise periodic portions of core region 620 that follow the core region 620 along the bend for a certain distance. According to certain embodiments of the invention, the gratings can accommodate a bend in the optical fiber by having a radially distal dimension 611 greater than its radially proximal dimension 612, such that the surfaces of the gratings defined by the areas at which the gratings interface with the core region 613 are roughly perpendicular to the surfaces of the gratings that bend with the optical fiber.

Those skilled in the art will recognize that the distance between gratings in the fiber Bragg grating may be adjusted to cause the fiber Bragg grating to reflect different wavelengths. Moreover, those skilled in the art will also recognize that fiber Bragg grating can be written using a variety of techniques known in the art, such as interference, masking, or point-by-point techniques, or any combination thereof. Furthermore, the fiber Bragg grating can be further adjusted, using techniques known in the art, to form different grating structures. These grating structures can include uniform, chirped, Gaussian apodized, raised-cosine apodized, discrete phase shift, and superstructure fiber Bragg gratings.

Figure 7:
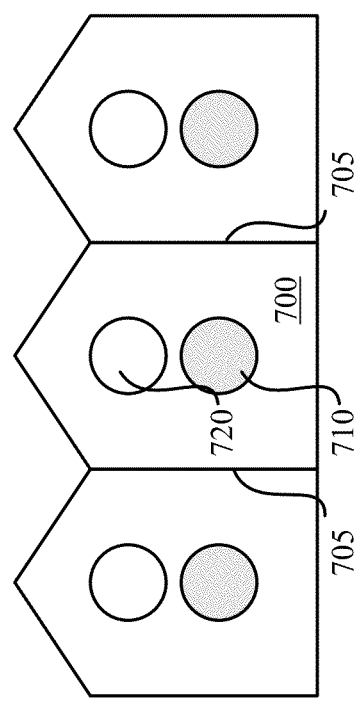
FIG. 7 shows the cross section of several coils of active optical fiber, according to some embodiments of the current invention.

FIG. 7 shows a cross-section view of three coils of optical fiber, according to one embodiment of the present invention. In this embodiment, a cladding region 700 surrounds a core region 710 and a mode confinement structure 720. In this embodiment the mode confinement structure is disposed within the cladding region on the radially distal side of the bend radius relative to the core region. This figure demonstrates one embodiment of how the cladding 700 can be shaped to maintain an orientation of the optical fiber relative to the bend by employing flat surfaces to abut against other coils in the optical fiber and/or a central spool around which the optical fiber may coil.

Figure 8:
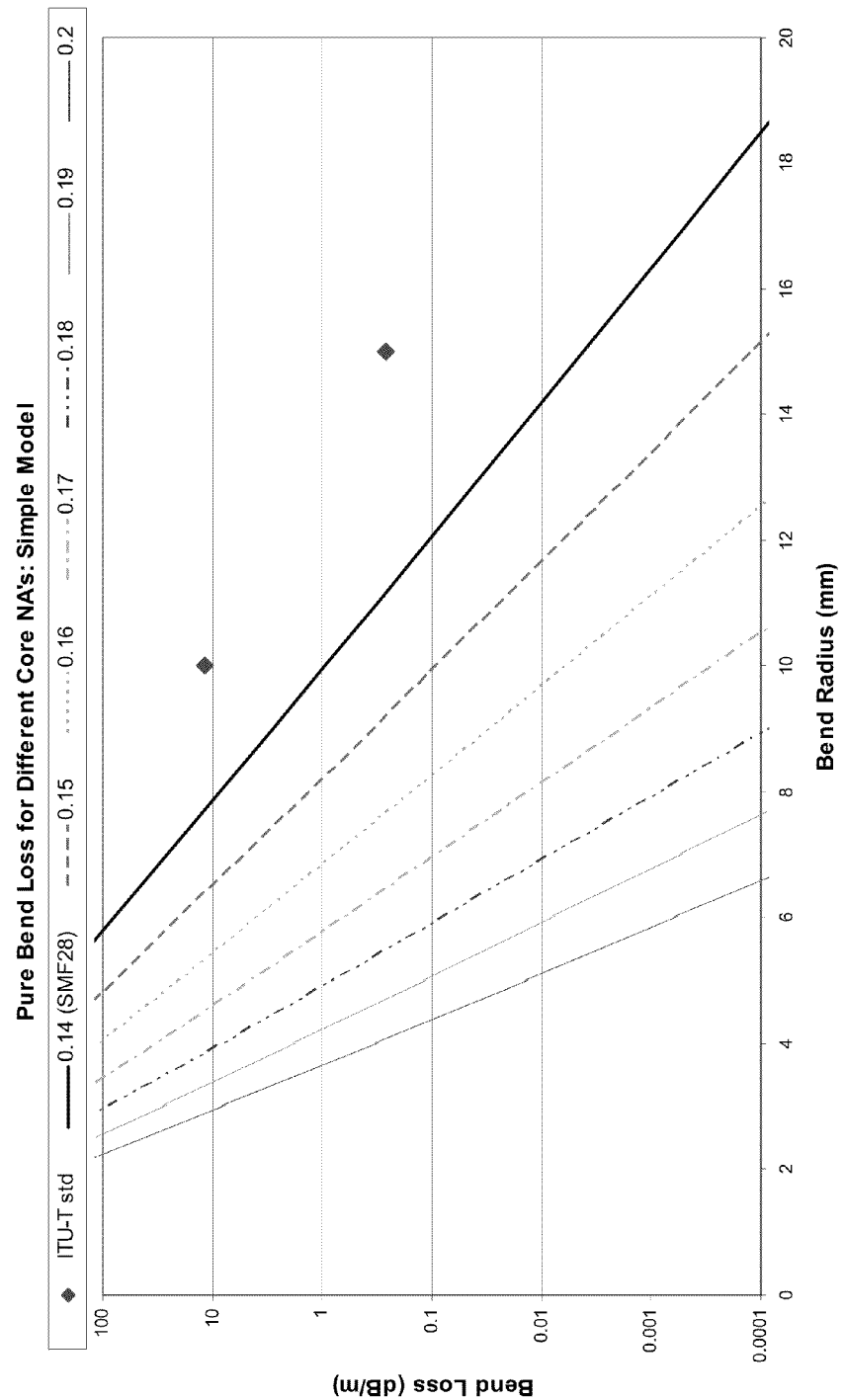
FIG. 8 shows a graph displaying the calculated bend loss as a function of bend radius optical fibers having various numerical aperture values.

FIG. 8 shows, for illustrative purposes, a graph displaying bend loss as a function of bend radius for various optical fibers, including two commonly-used fibers, based on a simple model using the standard formula for bend loss. The core diameter for the plotted fibers is 8.2 microns, and similar graphs for other core diameters may be created using known bend-loss formulas. For many applications requiring gain, a desirable threshold value in bend loss is 1 dB per meter, above which bend loss can be unsuitable for tightly-coiled active optical fiber applications requiring gain. The graph illustrates, for example, that bend loss for optical fibers having a core diameter of 8.2 microns and NA value of 0.14 may be suitable for applications requiring a 10 mm bend radius, but may not be suitable for applications requiring a smaller bend radius. The graph further demonstrates how other optical fibers may be suitable for bend radii less than 10 mm.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A rare-earth doped, tightly-coiled optical fiber comprising:
    a core region having a first refractive index, the core region being doped with one or more rare earth elements;
    a cladding region having a second refractive index lower than the first refractive index, the cladding region surrounding the core region to form a length of optical fiber;
    one or more coils formed from the length of optical fiber, the one or more coils having a bend radius of 10 millimeters or less and having a bend loss of 1 dB per meter or less; and
    a mode confinement structure adapted to reduce modal distortion, the mode confinement structure disposed within the cladding region on the radially distal side of the bend radius relative to the core region.

2. The rare-earth doped, tightly-coiled optical fiber as recited in claim 1, further configured to:
    receive light from a laser source; and
    absorb light from a flash pump.

3. The rare-earth doped, tightly-coiled optical fiber as recited in claim 1, wherein the cladding region further comprises
    one or more surfaces structurally adapted to maintain an orientation of the rare-earth doped, tightly-coiled optical fiber with respect to the bend radius.

4. The rare-earth doped, tightly-coiled optical fiber as recited in claim 1, wherein the cladding region of the coiled optical fiber forms a first cladding region, the rare-earth doped, tightly-coiled optical fiber further comprising:
    a second cladding region having a third refractive index higher than the second refractive index, the second cladding region surrounding the first cladding region.

5. The rare-earth doped, tightly-coiled optical fiber as recited in claim 1, further comprising one or more fiber Bragg gratings providing a plurality of individual grating periods, the grating periods structurally adapted to accommodate the one or more coils formed by the rare-earth doped, tightly-coiled optical fiber.

6. The rare-earth doped, tightly-coiled optical fiber as recited in claim 1, further comprising a carbon coating surrounding the cladding region.

7. The rare-earth doped, tightly-coiled optical fiber as recited in claim 1, further comprising a metal coating surrounding the cladding region.

* * * * *